Figure 1:
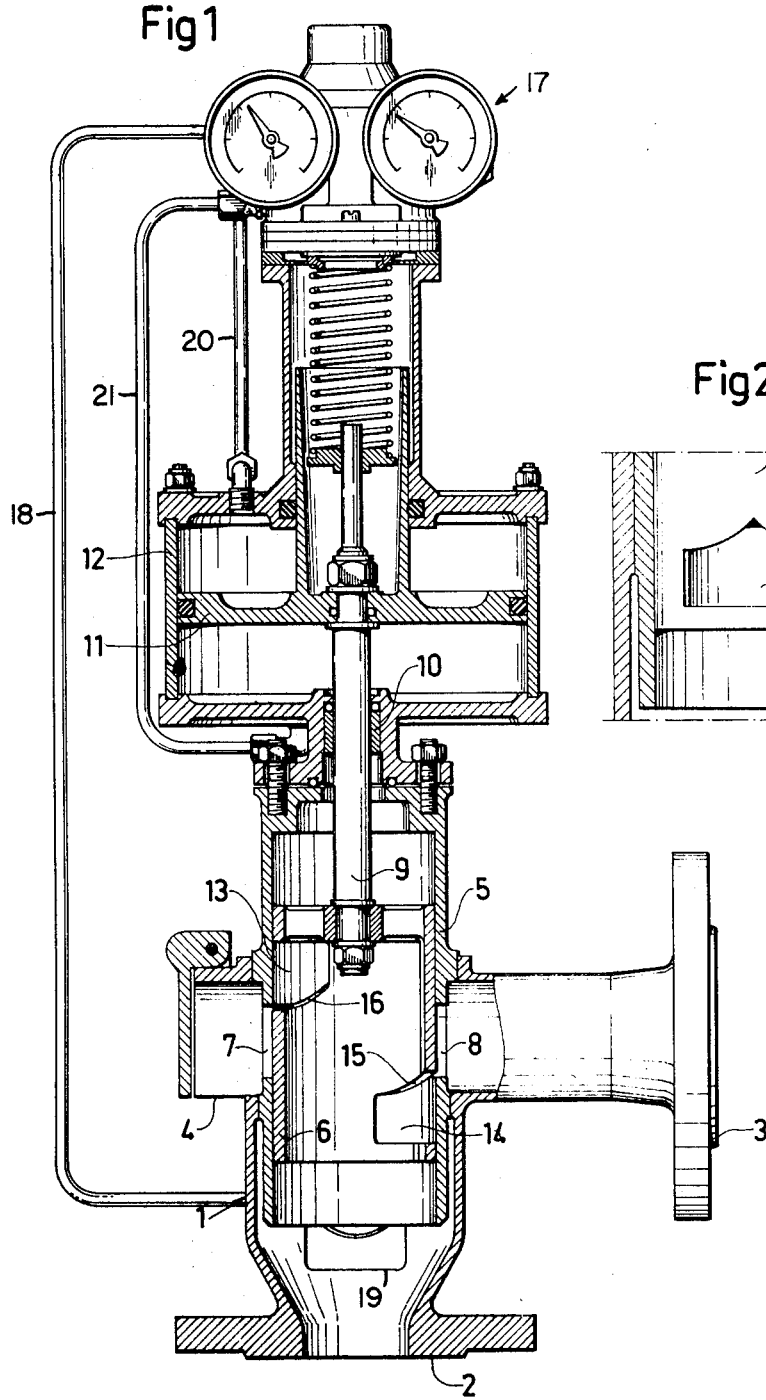

United States Patent

[11] 3,590,848

[72] Inventor Sven Alvar Svensson
 Farsta, Sweden
[21] Appl. No. 769,498
[22] Filed Oct. 22, 1968
[45] Patented July 6, 1971
[73] Assignee Ingeniorsfirman Fliesberg Aktiebolag
 Stockholm, Sweden
[32] Priority Mar. 21, 1968
[33] Sweden
[31] 3790/68

[54] REGULATOR FOR MAINTAINING WITHIN A
 RESTRICTED SPACE A CONSTANT PRESSURE
 WHICH IS LOWER THAN THE AMBIENT
 PRESSURE
 1 Claim, 2 Drawing Figs.
[52] U.S. Cl.................................................. 137/116.3,
 137/625.68
[51] Int. Cl..................................................... F16k31/365
[50] Field of Search........................................ 137/116.3,
 116.5, 625.66, 625.68, 596.18, 625.66, 625.68,
 625.67

[56] References Cited
UNITED STATES PATENTS

| | | | |
|---|---|---|---|
| 1,982,045 | 11/1934 | Clithero | 137/625.68 X |
| 1,656,132 | 1/1928 | Arrasmith | 137/596.18 |
| 2,950,730 | 8/1960 | Svensson | 137/116.3 |
| 3,227,179 | 1/1966 | Rosaen | 137/116.3 X |
| 3,429,683 | 2/1969 | Jehn | 137/625.66 |

Primary Examiner—Harold W. Weakley
Attorney—Birch, Swindler, McKie & Beckett

ABSTRACT: A regulator for maintaining within a restricted space a selected pressure less than ambient pressure including a valve connected between a low-pressure generating means, ambient air and the restricted space, and a valve control device operating the valve. The valve comprises a valve housing having ports communicating with the low-pressure generating means, ambient air, and the restricted space, and a hollow piston having openings which can register with the ports to varying degrees. The openings and the ports are of particular designs which enhance the smooth operation of the valve and promote precise control of the exposure of the restricted space to ambient air and the low-pressure generating means.

REGULATOR FOR MAINTAINING WITHIN A RESTRICTED SPACE A CONSTANT PRESSURE WHICH IS LOWER THAN THE AMBIENT PRESSURE

The present invention is concerned with a regulator for maintaining within a restricted space, such as a suction box in paper-making machines or the like, a constant pressure which is lower than the ambient pressure.

Several different types of regulators for this purpose are known to the art. One feature common to all such regulators is that they include a valve device which is connected between the restricted space and a means for producing the lower pressure and which usually connects said space with the surrounding air and the low-pressure generating means. For this reason, the valve device is provided with seat valves or slide valves which are held closed by a spring force.

These known regulators, however, are encumbered with a number of disadvantages. Among other things they are difficult to control at the speed and accuracy necessary in rapidly operating machines, such as paper-making machines, in which they are intended for use. Furthermore, they quickly become dirty which results in impaired function.

The object of the present invention is to provide a regulator of the type described in the introduction, which operates very rapidly and accurately and is insensitive to dirt. This object is realized by the present invention which is mainly characterized in that the valve device is controlled by a spring loaded piston or the like which is actuated in dependence on the prevailing pressure in the restricted space, and in that the valve device has a tubular open-ended valve body which is axially slidable in a valve housing and provided with openings in its cylindrical surface, where one open end of the valve body communicates with the space and the openings in its cylindrical surface are capable of connecting its interior with the ambient air and the low-pressure generating means.

Figure 2:
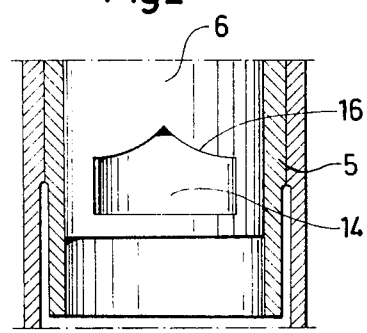

The invention will now be described in more detail with reference to an embodiment of a regulator according to the invention shown in the accompanying drawing, in which FIG. 1 shows a section through the regulator and FIG. 2 is a detail view of the valve body in the regulator, seen from the left in FIG. 1.

The regulator according to the invention includes a valve device which is connected between the restricted space where the pressure is to be controlled and a low-pressure generating means. The valve device is indicated generally by the reference numeral 1 and is provided with a connection 2 to the space where the pressure is to be controlled, a connection 3 to a low-pressure generating means and a connection 4 to the ambient air. The valve device 1 includes a valve housing 5 and a tubular valve member or body 6 which is axially slidable in said housing. The lower end of the valve housing 5 is open and communicates, via connection 2, with the space where the pressure is to be controlled. Disposed in the wall of the valve housing 5 are openings 7 and 8 which join the interior of the valve housing with the connections 3 and 4. The openings 7 and 8 are suitably rectangular in shape, and are longer in the peripheral direction of said housing than vertically thereof.

The valve body 6 is open at both ends and is fixed at its upper end to a rod 9 which passes through an opening in the upper end wall of the valve housing 5 and is sealed thereagainst by means of a seal 10. The upper end of the rod 9 is secured to a piston 11 which slides axially in a cylinder 12, which is arranged immediately above the upper end of the valve housing 5.

Located in the cylindrical surface of the valve body 6 are two openings 13 and 14, of which the opening 13 is arranged to register with the opening 7 in the valve housing 5 when the valve body 6 is in its lowermost position, that is when the piston 11 is at the bottom of cylinder 12. The opening 14 is arranged to register with the opening 8 in the valve housing 5 when the valve body 6 is in its uppermost position, that is when the piston is at the top of cylinder 12. The edge 15 and 16 respectively which is exposed first and covered last in the openings 13 and 14 is preferably not completely straight, but is so designed that the opening obtains a pronounced obtuse apex in that direction. Any dirt which collects and fastens in the opening when this is exposed can thus be scraped away by the respective edges 15,16 when the opening is closed, and this can be effected without necessitating abnormally high closing forces. This design of the openings 13 and 14 also provides a more advantageous opening and closing curve than in the case of fully rectangular openings.

The relative position between the openings 7, 8, 13 and 14 is such that when the valve body 6 is in an intermediate position (as shown in FIG. 1) the passage both through the openings 7 and 13 and through openings 8 and 14 is slightly open.

The position of piston 11 in the cylinder 12, and thus also the position of valve body 6, is controlled with a starting point from the conditions prevailing in the space in which the pressure is to be controlled. How this control is effected, however, lies beyond the scope of the present invention and need not be described in detail here. As schematically shown in FIG. 1, a control device 17 of any conventional design is connected by a conduit 18 which has an inlet 19 in the connection 2 which communicates with the space where the pressure is to be controlled. The control device 17 is also connected by conduits 20 and 21 to the cylinder 12 on opposite sides of the piston 11. In accordance with well-known techniques any variation in the pressure in the space to be controlled is translated into movement of the piston 11 in one direction or the other. Further details concerning the control system are not necessary to an understanding of the invention. Nevertheless, it should be mentioned that control is effected with the assistance of a pneumatic signal having a pressure of, for instance, $0.2-1.0$ kg/cm$^2$. This signal is sent from, for example, a pressure transmitter. In addition, there is provided a position indicator which is fed with air pressurized to 1.4 kg/cm$^2$, for example, wherewith the feed from the position indicator to the space above or below the piston 11 is controlled by the pressure transmitter. The setting forces on the piston 11 are hence very high, and consequently any foreign matter collected in the openings can easily be cut away when the valve body 6 is moved.

The regulator also can be provided with a so called supply valve including a system with three diaphragms, whereby one of the diaphragm chambers is connected to the regulator or the pipe to which the regulator is connected. The other chamber can be connected to another pressure in order to keep a constant pressure differential between two systems.

The supply valve can be controlled by spring pressure or by remote control with air pressure. As a complement this type of regulator can also be provided with a position indicator.

I claim:

1. A regulator for maintaining within a restricted space a selected constant pressure less then ambient pressure including a valve having an opening connected to a low-pressure generating means, ambient air and said restricted space, and a valve control device including a connecting rod driven by a piston operating said valve in response to the pressure in said restricted space, said valve comprising a cylindrical valve housing having a first port communicating with the low pressure generating means, a second port communicating with ambient air, and a third port communicating with said restricted space, said first port and said second port being in the sides of said cylindrical valve housing and of rectangular shape longer in the circumferential direction of said housing than in the axial direction thereof, and said third port being in one end of said cylindrical housing, a hollow tubular valve member operatively connected at one end to said connecting rod and axially and sealably slidable in said housing in response to said valve control device, said connecting rod sealably extending through the other end of said cylindrical housing, said third port continuously registering with the interior of said hollow valve member, said hollow valve member having a first opening and a second opening in the sides thereof, said first opening fully registering with said first port when said valve member is in a first position and said second opening fully registering with said second port when said valve member is in a second position axially spaced from said first position, said first opening and said second opening partially registering with said first port and said second port respectively when said valve member is intermediate said first and second positions, said first opening and said second opening each having side edges and a leading edge that is exposed first and covered last by said first port and said second port respectively, each said leading edge comprising two opposed portions each intersecting one of said side edges and being curved from their intersections with said side edges in the direction of first exposure and intersecting one another to define an obtuse angle having an apex pointed in the direction of first exposure.